United States Patent [19]

Nelson, Jr.

[11] 3,749,808

[45] July 31, 1973

[54] LOW DISTORTION OPTICAL ORGAN

[75] Inventor: Carl S. Nelson, Jr., Los Angeles, Calif.

[73] Assignee: Mattel, Inc., Hawthorne, Calif.

[22] Filed: Mar. 24, 1972

[21] Appl. No.: 237,849

[52] U.S. Cl. .............................. 84/1.18, 84/DIG. 7
[51] Int. Cl. .............................. G10h 3/06
[58] Field of Search .............. 84/1.01, 1.18, DIG. 7

[56] References Cited

UNITED STATES PATENTS

| | | | |
|---|---|---|---|
| 3,325,581 | 6/1967 | Young | 84/1.18 X |
| 3,464,030 | 8/1969 | Brogan | 84/1.18 X |
| 3,647,927 | 3/1972 | Chang et al. | 84/1.18 |
| 3,086,122 | 4/1963 | Jones | 84/1.18 X |
| 3,214,507 | 10/1965 | Williams | 84/1.18 |
| 3,378,625 | 4/1968 | Hurvitz | 84/1.18 X |
| 3,873,637 | 2/1959 | Herold | 84/DIG. 7 |

*Primary Examiner*—Richard B. Wilkinson
*Assistant Examiner*—Stanley J. Witkowski
*Attorney*—Seymour A. Scholnick

[57] ABSTRACT

An organ of the type which includes a disc with optical tracks and a row of photovoltaic cells that generate an output dependent upon the light shining through the tracks, which reproduces the sounds recorded on the tracks with a minimum of distortion. An amplifier for coupling to each photocell has an input impedance that is at least an order of magnitude less than of the cell, so that the amplifer substantially short circuits the cell to cause operation of the cell in a current mode, the amplifier generating a large voltage output proportional to the current through the cell. A switch for connecting each cell to the amplifier has a resistance which varies continually from an initial value greater than the internal impedance of the cell to a value that is an order of magnitude less than the impedance of the cell.

7 Claims, 6 Drawing Figures

FIG. 4
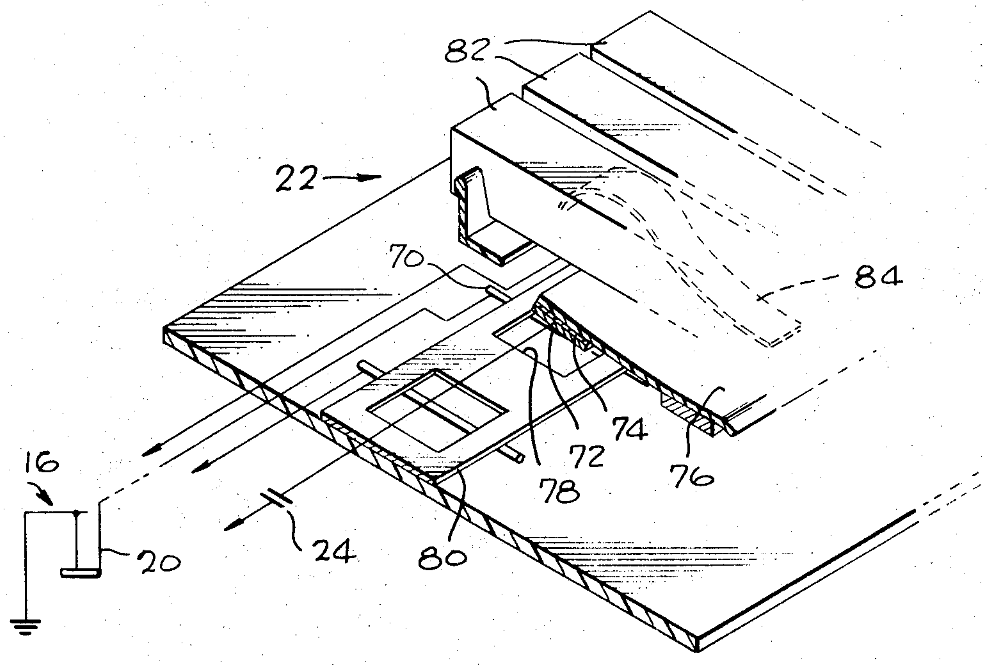
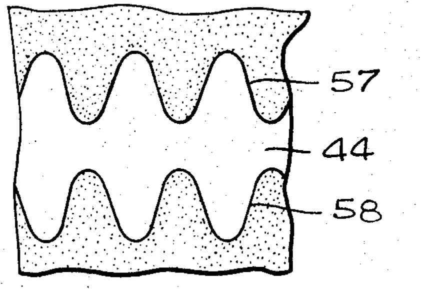
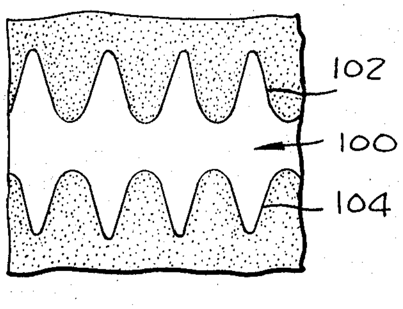
FIG. 5 FIG. 6

LOW DISTORTION OPTICAL ORGAN

BACKGROUND OF THE INVENTION

This invention relates to organs, and more particularly to organs of the type which include optical recordings that are played by shinning light through them onto photocells.

One type of electronic organ utilizes an optical disc record which has transparent tracks that allow light to shine therethrough onto a row of photocells. The transparent tracks undulate in width so that as the record rotates, the photocells can generate audio frequency signals. Each photocell is connected through a key-operated switch to the input of an amplifier, so that when a musician depresses a key the signals reach the amplifier and can drive a loudspeaker. Photovoltaic silicon cells are desirable for use in these applications, because they are relatively inexpensive and can provide an audio frequency response. One type of optical organ utilizes what is generally considered an ideal amplifier, which is an amplifier with a very high input impedance and a very low output impedance so that it drains very little signal from the source and it can drive the loudspeaker to create loud sounds. The photovoltaic cells generate a voltage which varies in accordance with the amount of light that is incident thereon, and the amplifier therefore drives the loudspeaker in proportion to the voltage generated by the cell without drawing substantial current from the cell.

Electronic organs of the type described above have been found to generate considerable distortion. The record tracks are recorded so that variations in the width of the track are proportional to the instantaneous intensity of the sound being recorded. The recorded sounds typically include one or a few fundamental frequencies and their harmonics, so that the borders of the track are sinusoidal waves representing these frequencies and superimposed on one another. The photocells, however, provide a voltage output that varies in a largely logarithmic manner with the amount of light thereon. Accordingly, the signal fed to the amplifier does not vary proportionately to track width, and there is distortion. Of course this distorted signal is amplified and appears in the output of the loudspeaker. It would be possible to construct the track so that its borders varied in accordance with an exponential function to compensate for the logarithmic photocell outputs. However, this would result in the undulations being crowded more closely together at certain points, which would make reproduction of higher audio frequencies more difficult.

SUMMARY OF THE INVENTION

In accordance with one embodiment of the present invention, an optical organ is provided which is of low cost and yet which minimizes distortion and noise. The organ includes an optical record with transparent tracks whose borders are substantially geometric addition or superimposing of a limited number of sinusoidal waves. A light source shines light through the tracks while a row of photovoltaic cells on the opposite side of the record generate signals dependent upon the widths of the tracks. A manually operated switch connects each cell to the input of an amplifier that drives a loudspeaker. The amplifier has a very low input impedance (as contrasted with the usual "idealized" amplifier that has an infinite input impedance), so that the cell operates in a current mode wherein its current output is closely proportional to the amount of incident light. The amplifier generates a voltage output which is proportional to the current generated by the photocell. Although the current is of an extremely low level, its magnitude is proportional to the amount of light incident upon the cell, so that the signal which drive the loudspeaker represents a minimum of distortion. The amplifier has a very high gain, in order that it may convert the very low level currents into appreciable output voltages and currents for driving the loudspeaker, but since a single amplifier can be utilized for a large number of photocells, such an amplifier does not result in a large increase in the cost of the entire organ.

The switches that connect the photocells to the amplifier input are closed when a musician depresses a key of a keyboard. In order to minimize noise when the switch is first closed, it is constructed to provide an initial resistance greater than the internal impedance of the corresponding photocell apparatus. The resistance continually decreases to a level much lower than the internal impedance of the photocell apparatus when it is fully closed, that is, when the musician has fully depressed the key that operates the switch. This results in a minimum loss of signal through the switch.

The novel features of the invention are set forth with particularity in the appended claims. The invention will best be understood from the following description when read in conjunction with the accompanying drawings.

BRIEF DESCRIPTION OF THE DRAWINGS

FIG. 4 is a partial prospective view of the switch arrangement of the apparatus of FIG. 1;

FIG. 5 is a partial enlarged view of the record of FIG. 2; and

FIG. 6 is a partial enlarged view of a record constructed in accordance with another embodiment of the invention.

DESCRIPTION OF THE PREFERRED EMBODIMENTS

Figures 1, 2, 3:
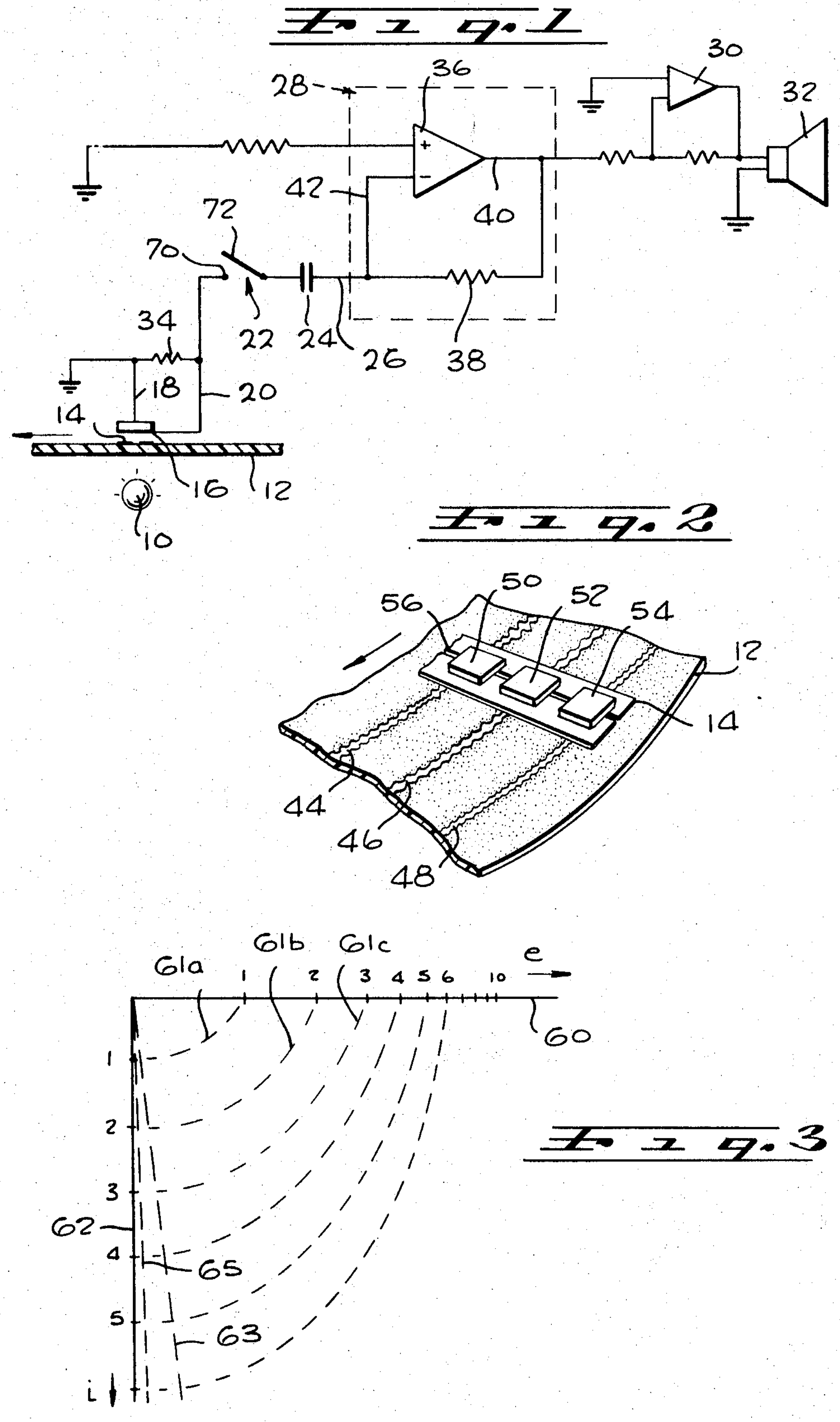
FIG. 1 is a schematic diagram of an organ constructed in accordance with the present invention.
FIG. 2 is a partial prospective view of the organ of FIG. 1, showing the record and photocell assembly thereof.
FIG. 3 is a graph showing the characteristics of the photocells of FIG. 2.

FIG. 1 illustrates an optical organ which includes a light source 10 that shines through transparent areas of an optical record 12 and through a mask 14 onto a photocell 16. The photocell 16 is a photovoltaic silicon cell which generates electricity when light is incident thereon. The cell has one terminal 18 which is electrically grounded and another terminal 20 which can be connected through a switch 22 and capacitor 24 to the input 26 of a pre-amplifier 28. The pre-amplifier generates an output which is further amplified by an amplifier 30 which drives a loudspeaker 32. A preloading resistor 34 is connected between the terminals 18, 20 of the cell to assure that the voltage at the terminal 20 is low prior to closing of the switch 22. The pre-amplifier 28 includes an operational amplifier 36 and a small resistance 38 connected between its output 40 and its inverting input terminal 42. This connection provides a low input impedance into the pre-amplifier input 26.

As a result, the photocell 16 is operated in a current mode and can provide only a very low output voltage. However, by operating the photocell in this mode, there is a minimum of distortion.

FIG. 2 illustrates a portion of the optical disc record 12, showing three tracks 44, 46, 48 thereof and three cells 50, 52, and 54 that lie opposite these tracks. The record disc 12 is substantially opaque except for the tracks, which are substantially transparent. The tracks undulate in width, and these undulations define sound which may be reproduced. Light shining through a track 44 passes through a very narrow slit 56 in the mask 14 and falls on the photocell 50. FIG. 5 illustrates a portion of the track 44 showing its shape where a simple sinusoidal frequency is recorded thereon. An optical record may contain many tracks, some of which define accompaniment patterns of notes that result in a complicated track, while others define sustained notes of an instrument. These sounds generally can be represented by one to several fundamental sinusoidal waves and overtones thereof. The borders 57, 58 of the single tone track 44 are defined by a sinusoidal wave. If overtones were present, they also would be represented by sinusoidal waves, that would be superimposed upon the fundamental sinusoidal wave. The variations in track width are therefore linearly proportional to the variations in instantaneous sound intensity of the sound that is represented and which should be reproduced. However, if the signal from the photocell is not also linearly proportional to the track width, there will be distortion.

FIG. 3 represents the output characteristics of a typical photovoltaic silicon cell. The abscissa 60 represents the load line when the cell is open circuited. The curved lines 61*a*, 61*b*, 61*c* represent different illumination levels of the cell. When the amount of light falling on the cell increases linearly along the line 60, the output voltage increases logarithmically. This can lead to considerable distortion if the light falling on the cell varies proportionately to the instantaneous intensity of the sound that should be reproduced as is the case for the track 44 of FIG. 5. If the current output of the cell is examined where there is a very low impednace across the cell terminals, as compared to the internal impedance of the cell, then the current varies along a load line that is coincident with the ordinate 62 in the graph of FIG. 3. The current through the cell then varies substantially proportionately with the amount of light incident on the cell. Photovoltaic cells are often considered to be voltage generating devices inasmuch as the output from such a cell is on the order of 1 volt when the cell is highly illuminated. It is relatively easy to amplify such an output, inasmuch relatively simple amplifiers are available with a very high input impedance that can utilize such a voltage to generate a current that can drive a loudspeaker. However, the non-linearity of the output results in distortion of the signal.

As mentioned above, the current output from the cell, when there is a low impedance across it, i.e., when it operates in a current mode, varies closely linearly with the light incident on the cell. However, the current is very low, particularly in the case of very small cells which are utilized for the relatively narrow tracks, and particularly where very little light falls on the cell as in the case of light passing through the slit 56 which may have a width on the order of one-thousandth inch. In accordance with the present invention, a pre-amplifier 28 is utilized which has a very low input impedance. Accordingly, the cell operates in a current mode wherein variations in its output are closely proportional to variation in the light incident thereon. The pre-amplifier 28 is constructed to convert very low current inputs, which may be on the order of microamperes, to a much stronger signal at its output 40. The output at 40 is further amplified by the amplifier 30 to provide an output for driving the loudspeaker 32, the voltage from the output of amplifier 30 varying proportionately to the voltage at its input. Thus, the combination of the pre-amplifier 28 and amplifier 30 is an amplifier or convertor that converts variations in a minute current input into variations in a voltage output. Furthermore, this amplifier arrangement provides a very low impedance across the cell 16 as compared to the cell internal impedance, so that its current output varies linearly with the incident light. The amplifier input impedance should be less than one-thirtieth the internal impedance of the photocell apparatus to greatly reduce distortion, and is preferably less than one-hundreth as great.

A typical photovoltaic silicon cell 16 of the small size that may be utilized in an optical organ, may have an internal impedance on the order of 75K ohms. An organ has been constructed utilizing this type of cell with a preload resistance 34 on the order of 4.7K ohms. The resistance 38 across the operational amplifier was on the order of 470 ohms, to provide a very low input impedance into the pre-amplifier 28, and yet to provide an appreciable voltage output at 40 from the pre-amplifier. The output of the cell in this situation is indicated by the load line 65 of FIG. 3, which is close to the current mode operation. The sound which was obtained using a record track which varied proportionately to the recorded sound, was found to have a very low level of distortion.

The preload resistance 34 assures that the direct-current voltage output is low even before the switch 22 is closed. Accordingly, there is a minimal noise created at the instant that the switch is closed due to the cell output terminal 20 being at a different voltage than the switch side of the capacitor 24. When only the preload resistance is present, the load line is at 63 of FIG. 3, while when the amplifier input impedance is present the load line is at 65. The preload resistance 34 is preferably less than about one-tenth the internal impedance of the cell in order to provide a low voltage output prior to closing of the switch. The resistance 38 across the amplifier should be much less than the preload resistance in order that most of the cell current will flow to the amplifier 28.

The operation of the photocells in a current mode results not only in lower distortion, but also in a great reduction of stray signal noise. The low impedance path between the photocells and the amplifier 36 does not readily pick up electrostatic signals that are commonly present in the environment where the organ is used, such as signals that may be emitted from a television receiver near the organ. The amount of noise can otherwise be considerable because of the long electrical paths resulting from the need for the current to flow through the key-operated switches 22. The low impedance path is more susceptible to the pick up of signals from changing magnetic fields in the environment, but these generally are not significant.

Prior to the closing of the switch 22, the voltage at the switch contact 70 leading to the cell terminal 20 may be different from that of the switch contact 72 that is connected to the coupling capacitor 24. The preload resistance 34 tends to minimize this, but there may still be an appreciable voltage difference. To avoid the creation of a large noticable "click" or "pop" sound, the switch 22 is constructed to provide an intially high resistance that continually decreases to a low level. As a result, only a very small current will initially flow through the switch when it is first closed, and if there is a click or pop sound it will not be highly noticable. FIG. 4 illustrates a switch construction which provides for such a gradual closing. The switch 22 includes a wire 70 that is connected to the photovoltaic cell terminal 20 and which acts as one switch contact, and a strip 72 of flexible electrically resistant material which serves as the other switch contact. The strip 72 is held by an insulative layer 74 onto another strip 76. The strip 76 can be downwardly deflected to move 2 portion of the contact strip 72 through a window 78 in a spacer strip 80 so that the contact strip 72 touches the contact 70.

When a musician depresses a key 82 of a keyboard, the key pivots downwardly, and a spring 84 with its rearward end fastened to the key, flattens against the strip 76 to depress it and cause the contact strip 72 to move down against the contact 70. The resistive material of the contact strip 72 has a high enough resistance so that when initial contact is established there is a very high resistance. This initial resistance is higher than that of the photocell apparatus, so that only a very small current initially flows through the switch. The initial switch resistance should be at least an order of magnitude (ten times) greater than the cell output impedance to substantially eliminate noise due to any difference in voltage at the cell and capacitor. As the musician completes his depression of the key 82, more of the contact strip 72 is layed onto the contact 70 and the resistance through the switch continually decreases down to a very low level. The final resistance level is preferably much lower than the resistance of the photocell apparatus, so that the switch offers very little resistance to the flow of current and does not interfere with operation of the photocell in the current mode. During the closing of the switch, when the resistance greatly decreases, the gain of the amplifier will increase. When the switch is closed, the resistance through it should be less than the preload resistance of the photocell means.

Instead of constructing the amplifier apparatus so that it operates the photovoltaic cells in a current mode, it is possible to operate them in a voltage mode, but to alter the record tracks to compensate for this. FIG. 6 illustrates a track 100 whose width varies logarithmically instead of proportionately to a sinusoidal sound that is recorded thereon. As a result, the borders 102 and 104 of the track are not sinusoidal, but vary rapidly along the peaks of the undulations and more slowly near the troughs. When light through the track 100 is detected by a photocell which is being operated in a voltage mode, so that its output increases logarithmically with incident light, distortion can be virtually eliminated. However, this requires that the logarithmic operation of the cell follow a predetermined logarithmic function. In practice, it is extremely difficult to provide a predetermined logarithmic operating characteristic, so that this manner of compensation is difficult to achieve. It does, however permit the use of more conventional preamplifiers that have a high input impedance and whose output voltage is proportional to the input voltage, and to enable a reduction in distortion in such apparatus.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. An organ comprising:

an optical record having a substantially transparent track of variable width defining musical sounds that include fundamental audio frequencies and harmonics thereof, the track width variations along the length of said track being proportional to the instantaneous intensity of the sounds defined therein, so that said track includes superimposed sinusoidal waves;

a light source disposed on one side of said track;

a photovoltaic cell disposed on a side of said track opposite said light source, said cell having a predetermined internal impedance;

a current-to-voltage converter means for producing an output voltage proportional to the current flow at its input, said converter means having an input impedance of less than one-thirtieth said internal impedance of said cell;

a loudspeaker;

means for connecting the output of said converter means to said loudspeaker; and means for coupling said cell to the input of said converter means.

2. The organ described in claim 1 wherein:

said means for coupling said cell to the input of said converter means includes a manually operable switch that varies in resistance continually between an initial value more than said internal impedance of said cell when said switch is first closed to a final value less than one-tenth said internal impedance when said switch is fully closed.

3. The organ described in claim 2 including:

a preload resistance constantly connected across said cell, said preload resistance being of a value less than one-tenth the internal impedance of said cell and more than the input impedance of said cell.

4. An organ comprising:

an optical record having a plurality of substantially transparent tracks which vary in width, at least one border of each track being primarily the geometric addition of a limited number of sinusoidal waves and their harmonics;

a light source disposed on one side of said tracks;

a plurality of photovoltaic cells, each disposed adjacent to one of said tracks on a side thereof opposite said light source, each cell having first and second electrical terminals, and having a predetermined internal impedance therebetween;

amplifier means coupled to the terminals of each cell, said amplifier means including a first means having an impedance less than one-thirtieth the internal impedance of each cell whereby each cell operates substantially in a current mode, and a second means coupled to said first means and responsive to the current through said first means for generating a voltage proportional thereto;

loudspeaker means coupled to said second means for producing audible sounds; and means for coupling said terminals of said cells to said first means of said amplifier means.

5. The organ described in claim 4 wherein:

said means for coupling said terminals of said cells to said first means includes manually key operated switches that each vary in resistance continually between an initial value greater than the internal impedance of the cell to which it is connected when the switch is first closed to a final value less than one-tenth said internal impedance.

6. The organ described in claim 4 including:

a preload resistance of less than one-tenth the internal impedance of said cells constantly connected across said cells.

7. An organ comprising:

an optical record having a track of variable opacity defining musical sounds, the opacity along the length of said track being proportional to the intensity of the sounds defined thereon;

a light source disposed on one side of said track;

photo sensitive cell means which produces a current output, when operated in a current mode, that is proportional to the amount of light incident thereon, and which has a predetermined internal impedance, said cell means including a portion disposed on a side of said track opposite said light source;

an amplifier having an input impedance which is less than one-thirtieth the internal impedance of said cell means;

loudspeaker means;

means for connecting the output of said amplifier to said loudspeaker means; and a manually operable switch connecting said cell means to the input of said amplifier, said switch including a sheet of resistive material, a contact, and a manually operable key for progressively laying said sheet onto said contact so that the contact area therebetween progressively increases, said resistive material providing an initial contact resistance between said sheet and contact which is greater than said internal impedance of said cell means, an providing a final contact resistance, when said key is fully operated, which is at least an order of magnitude less than the output impedance of said cell means.

* * * * *